(12) United States Patent
Adachi

(10) Patent No.: US 10,365,739 B2
(45) Date of Patent: Jul. 30, 2019

(54) DISPLAY DEVICE

(71) Applicant: Japan Display Inc., Tokyo (JP)

(72) Inventor: Koichiro Adachi, Tokyo (JP)

(73) Assignee: Japan Display Inc., Tokyo (JP)

( * ) Notice: Subject to any disclaimer, the term of this patent is extended or adjusted under 35 U.S.C. 154(b) by 189 days.

(21) Appl. No.: 15/485,539

(22) Filed: Apr. 12, 2017

(65) Prior Publication Data

US 2017/0308211 A1    Oct. 26, 2017

(30) Foreign Application Priority Data

Apr. 25, 2016    (JP) ................................ 2016-086984

(51) Int. Cl.
| | |
|---|---|
| *G02F 1/1343* | (2006.01) |
| *G06F 3/041* | (2006.01) |
| *G02F 1/1333* | (2006.01) |
| *G06F 3/044* | (2006.01) |

(52) U.S. Cl.
CPC ........ *G06F 3/0412* (2013.01); *G02F 1/13338* (2013.01); *G02F 1/134309* (2013.01); *G06F 3/044* (2013.01); *G02F 2001/134345* (2013.01); *G06F 2203/04101* (2013.01); *G06F 2203/04111* (2013.01)

(58) Field of Classification Search
None
See application file for complete search history.

(56) References Cited

U.S. PATENT DOCUMENTS

| | | | |
|---|---|---|---|
| 9,317,166 B2 | 4/2016 | Miyazaki et al. | |
| 9,471,166 B2 | 10/2016 | Sekiguchi | |
| 2004/0234163 A1* | 11/2004 | Lee | ........................ G06T 3/4092 |
| | | | 382/298 |
| 2009/0322802 A1* | 12/2009 | Noguchi | .............. G09G 3/2003 |
| | | | 345/694 |
| 2012/0242606 A1* | 9/2012 | Mackey | .................. G06F 3/044 |
| | | | 345/173 |
| 2013/0293491 A1* | 11/2013 | Doi | ......................... G06F 3/044 |
| | | | 345/173 |

(Continued)

FOREIGN PATENT DOCUMENTS

| | | |
|---|---|---|
| JP | 2014-178847 A | 9/2014 |
| JP | 2015-035122 A | 2/2015 |

*Primary Examiner* — Dorothy Harris
(74) *Attorney, Agent, or Firm* — Michael Best & Friedrich LLP

(57) ABSTRACT

The display device includes a detection electrode, a display pattern, a detection circuit connected to the detection electrode, a plurality of subpixel regions in which pixel electrodes are formed, pixel regions each composed of the subpixel regions, and a display region in which the pixel regions are arrayed. The pixel regions each include a first color subpixel region and a second color subpixel region. The subpixel regions are arrayed in a Y direction in the display region. First patterns having a circular or polygonal shape in a plan view are formed in the detection electrode. The detection electrode includes a first region electrically connected to the detection circuit and a second region separated from the detection circuit inside the display region. The first region extends in an X direction and a virtual line connecting centers of the adjacent first patterns extends in the X direction.

19 Claims, 11 Drawing Sheets

(56) References Cited

U.S. PATENT DOCUMENTS

| | | | | |
|---|---|---|---|---|
| 2014/0138125 A1* | 5/2014 | Iwase | ..................... | H05K 1/092 |
| | | | | 174/251 |
| 2014/0285737 A1* | 9/2014 | Takahashi | .............. | B29C 59/002 |
| | | | | 349/12 |
| 2014/0338960 A1* | 11/2014 | Inoue | ........................ | B32B 7/02 |
| | | | | 174/253 |
| 2014/0352143 A1* | 12/2014 | Cok | ........................ | G06F 3/044 |
| | | | | 29/825 |
| 2015/0042909 A1* | 2/2015 | Sekiguchi | ............. | G06F 3/0412 |
| | | | | 349/12 |
| 2015/0309358 A1* | 10/2015 | Nomura | .............. | G02F 1/13394 |
| | | | | 349/42 |
| 2015/0355751 A1* | 12/2015 | Kurasawa | ................ | G06F 3/044 |
| | | | | 345/174 |
| 2016/0274727 A1* | 9/2016 | Nakamura | ............. | G06F 3/044 |
| 2018/0188860 A1* | 7/2018 | Yang | ........................ | G06F 3/044 |

* cited by examiner

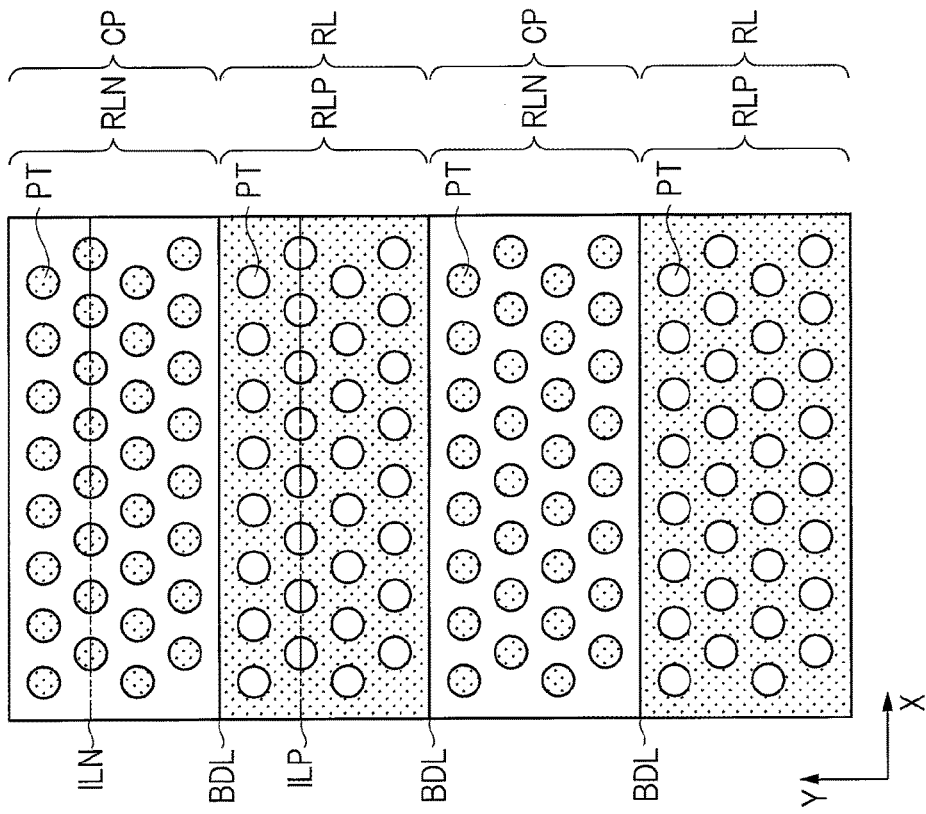
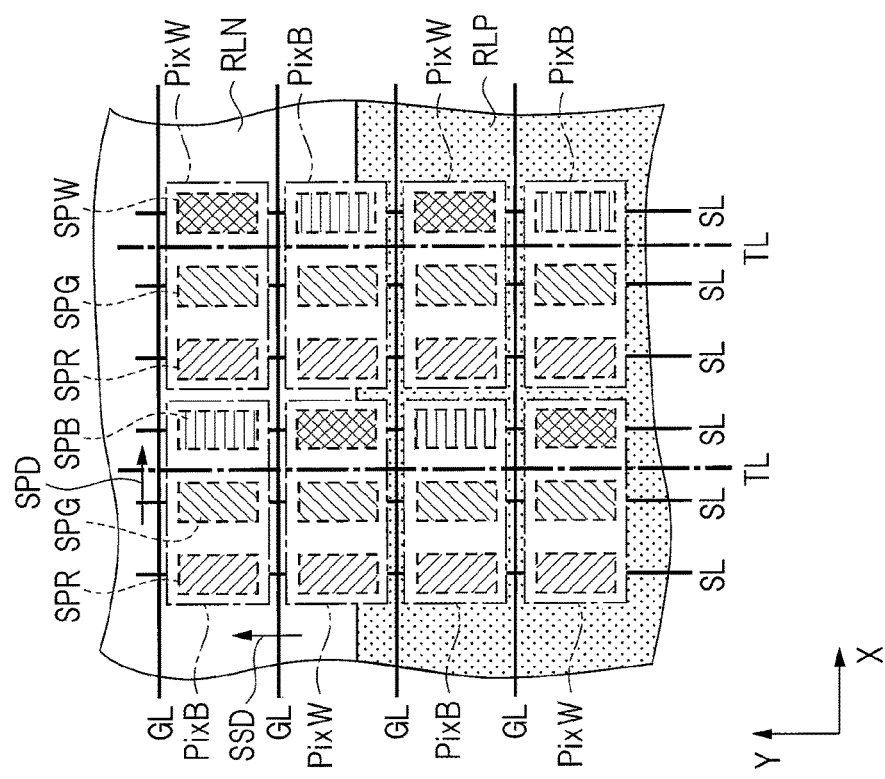
FIG. 3A
FIG. 3B

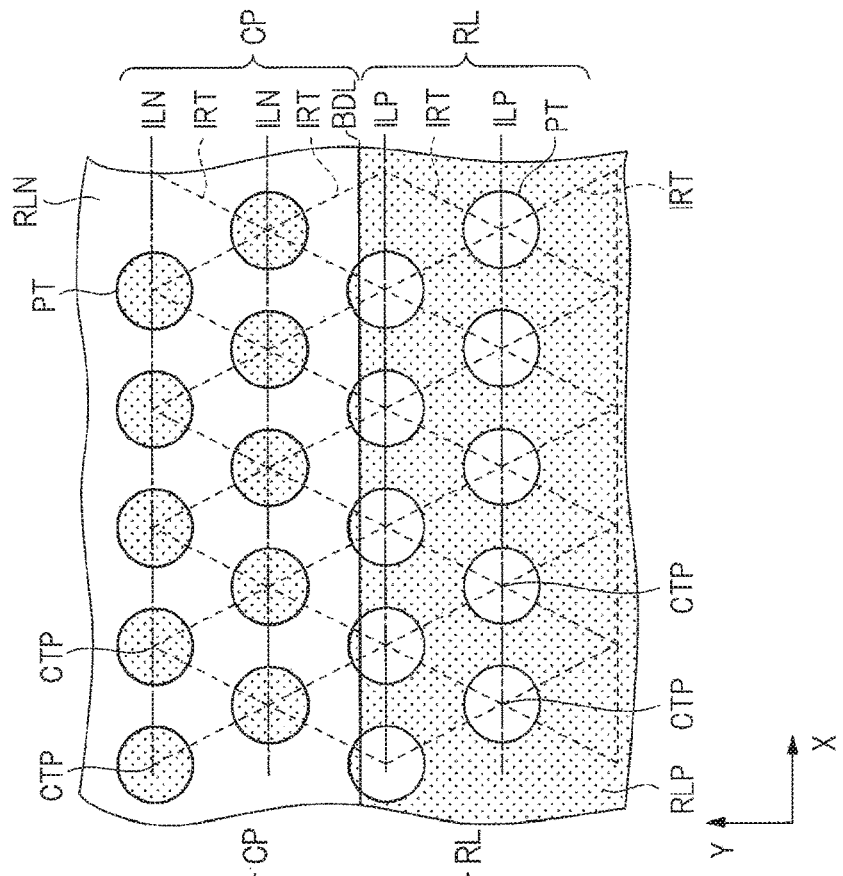
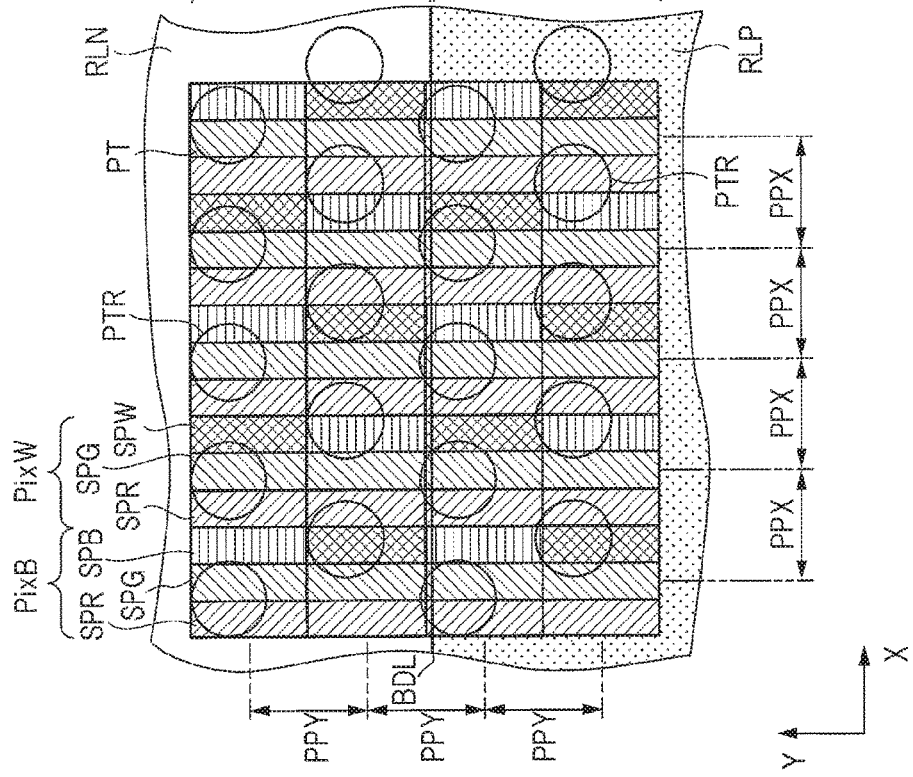
FIG. 4A
FIG. 4B

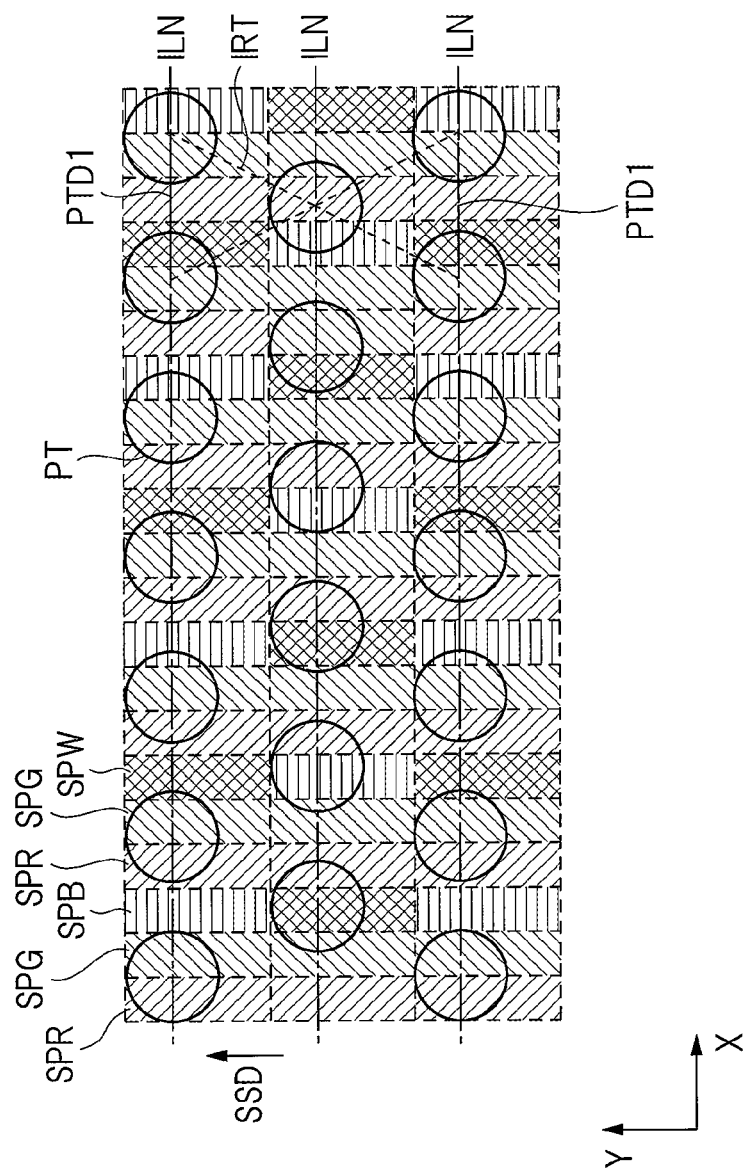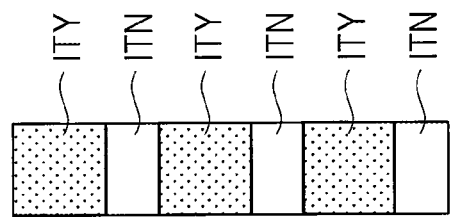

FIG. 7A

| | PIXEL PITCH PPD | PATTERN PITCH PTD | | | | | |
|---|---|---|---|---|---|---|---|
| | | 77.0 μm | 66.0 μm | 62.0 μm | 58.0 μm | 54.5 μm | 50.5 μm |
| EXAMPLE 1 | 42.83 μm | 3 | 2 | 3 | 4 | 4 | 5 |
| EXAMPLE 2 | 49.28 μm | 2 | 5 | 3 | 5 | 4 | 3 |
| EXAMPLE 3 | 63.00 μm | 3 | 2 | 3 | 1 | 1 | 2 |
| EXAMPLE 4 | 65.70 μm | 3 | 3 | 1 | 2 | 1 | 2 |
| EXAMPLE 5 | 74.05 μm | 2 | 1 | 1 | 3 | 2 | 3 |
| EXAMPLE 6 | 74.85 μm | 3 | 1 | 2 | 3 | 2 | 4 |
| EXAMPLE 7 | 75.00 μm | 2 | 1 | 2 | 3 | 2 | 4 |

FIG. 7B

| | PIXEL PITCH PPD | PATTERN PITCH PTD | | | | | |
|---|---|---|---|---|---|---|---|
| | | 77.0 μm | 66.0 μm | 62.0 μm | 58.0 μm | 54.5 μm | 50.5 μm |
| EXAMPLE 8 | 42.83 μm | 3 | 4 | 2 | 3 | 4 | 5 |
| EXAMPLE 9 | 49.28 μm | 3 | 2 | 3 | 5 | 5 | 3 |
| EXAMPLE 10 | 63.00 μm | 3 | 2 | 2 | 1 | 2 | 4 |
| EXAMPLE 11 | 65.70 μm | 4 | 3 | 2 | 1 | 2 | 4 |
| EXAMPLE 12 | 74.05 μm | 3 | 2 | 2 | 4 | 4 | 3 |
| EXAMPLE 13 | 74.85 μm | 4 | 2 | 2 | 5 | 3 | 2 |
| EXAMPLE 14 | 75.00 μm | 3 | 2 | 2 | 5 | 3 | 2 |

FIG. 7C

| | PIXEL PITCH PPD | PATTERN PITCH PTD | | | | | |
|---|---|---|---|---|---|---|---|
| | | 77.0 μm | 66.0 μm | 62.0 μm | 58.0 μm | 54.5 μm | 50.5 μm |
| EXAMPLE 1 | 42.83 μm | 1.80 | 1.54 | 1.45 | 1.35 | 1.27 | 1.18 |
| EXAMPLE 2 | 49.28 μm | 1.56 | 1.34 | 1.26 | 1.18 | 1.11 | 1.02 |
| EXAMPLE 3 | 63.00 μm | 1.22 | 1.05 | 0.98 | 0.92 | 0.87 | 0.80 |
| EXAMPLE 4 | 65.70 μm | 1.17 | 1.00 | 0.94 | 0.88 | 0.83 | 0.77 |
| EXAMPLE 5 | 74.05 μm | 1.04 | 0.89 | 0.84 | 0.78 | 0.74 | 0.68 |
| EXAMPLE 6 | 74.85 μm | 1.03 | 0.88 | 0.83 | 0.77 | 0.73 | 0.67 |
| EXAMPLE 7 | 75.00 μm | 1.03 | 0.88 | 0.83 | 0.77 | 0.73 | 0.67 |

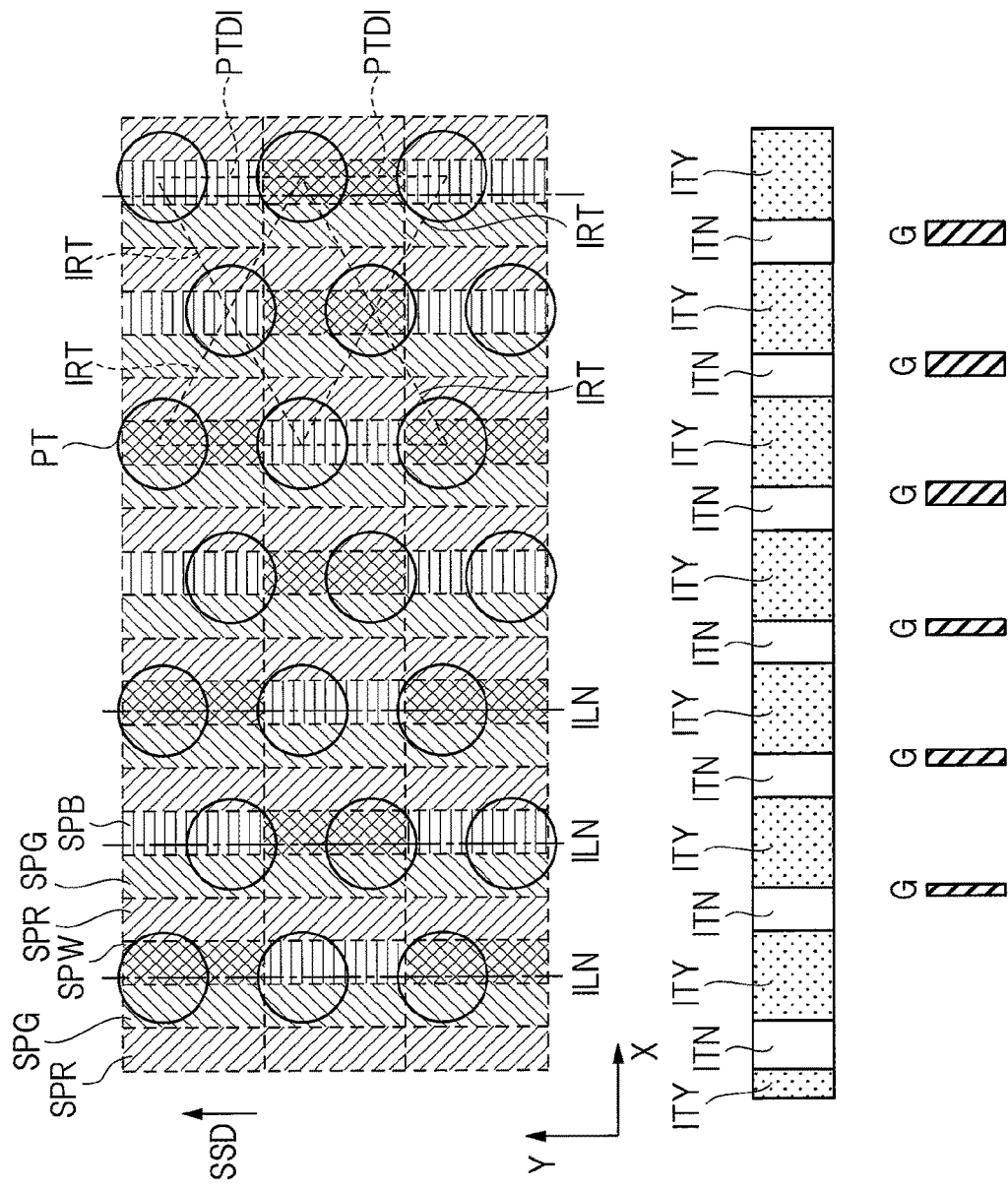

DISPLAY DEVICE

CROSS-REFERENCE TO RELATED APPLICATION

The present application claims priority from Japanese Patent Application No. 2016-086984 filed on Apr. 25, 2016, the content of which is hereby incorporated by reference into this application.

TECHNICAL FIELD OF THE INVENTION

The present invention relates to a display device, and particularly to a touch detection function-equipped display device capable of detecting proximity or contact of an external object.

BACKGROUND OF THE INVENTION

Recently, a focus has been placed on a touch detection device referred to as a touch panel, which is capable of detecting proximity or contact (hereinafter, referred to also as touch for convenience) of an external object. The touch detection device is integrated with a liquid crystal display device, and is provided as a touch detection function-equipped display device. An electrostatic capacitance method has been known as a method of detecting the touch of the external object. In the touch detection function-equipped display device of the electrostatic capacitance method, a detection electrode is arranged so as to cross a drive electrode. A capacitance is formed at a crossing portion of the drive electrode and the detection electrode, the amount of charge stored in the capacitance of the crossing portion is changed when an external object such as a finger touches this crossing portion, and the change of the amount of charge is detected to detect the touch of the external object.

Japanese Patent Application Laid-Open No. 2015-35122 (Patent Document 1) discloses a touch panel provided with a detection electrode in which polygonal holes separated from each other are arranged in a matrix form in plan view.

SUMMARY OF THE INVENTION

In the detection electrode in which the polygonal holes are arranged in a matrix form, transmittance differs between a part of the polygonal hole and a part where the hole is not arranged. Meanwhile, when an image is displayed in color, one pixel is composed of, for example, three subpixels corresponding to three primary colors. Since green has higher luminance than the other colors among the three primary colors, there is a fear about the generation of an interference fringe (hereinafter, referred to also as moire) when subpixels corresponding to green are concentrated on a part where the transmittance of the detection electrode is high.

In Patent Document 1, subpixels corresponding to three primary colors are not disclosed, and further, a relationship between the subpixel and the detection electrode is not disclosed.

An object of the present invention is to provide a display device capable of reducing the generation of moire.

A display device according to an aspect of the present invention includes: a detection electrode and a conductive pattern which are provided in an insulating substrate and formed of a conductive film; a detection circuit which is electrically connected to the detection electrode and detects proximity or contact of an object; a plurality of subpixel regions in which pixel electrodes are formed; pixel regions each composed of the plurality of subpixel regions; and a display region in which the pixel regions are arrayed. In this case, the pixel regions each include a first subpixel region of a first color and a second subpixel region of a second color as the plurality of subpixel regions, a plurality of the first subpixel regions are arrayed in a first direction in the display region, a plurality of first patterns are formed in the detection electrode in a plan view, the detection electrode includes a first region that is electrically connected to the detection circuit inside the display region, the conductive pattern includes a second region that is separated from the detection electrode, the first region extends in a second direction crossing the first direction, and a virtual line connecting centers of the plurality of first patterns adjacent to each other extends in the second direction.

BRIEF DESCRIPTIONS OF THE DRAWINGS

FIG. 3A is a plan view of a display module according to the first embodiment;

FIG. 3B is a plan view of a display module according to the first embodiment;

FIG. 4A is a plan view illustrating a configuration of a detection electrode according to the first embodiment;

FIG. 4B is a plan view illustrating a configuration of a detection electrode according to the first embodiment;

FIG. 6A is a plan view illustrating a display region according to the first embodiment;

FIG. 6B is a plan view illustrating a display region according to the first embodiment;

FIG. 7A is a table illustrating evaluation results of moire in the display device;

FIG. 7B is a table illustrating evaluation results of moire in the display device;

FIG. 7C is a table illustrating evaluation results of moire in the display device;

FIG. 13A is an explanatory diagram for describing the generation of moire;

FIG. 13B is an explanatory diagram for describing the generation of moire; and

FIG. 13C is an explanatory diagram for describing the generation of moire.

DESCRIPTIONS OF THE PREFERRED EMBODIMENTS

Figure 1:
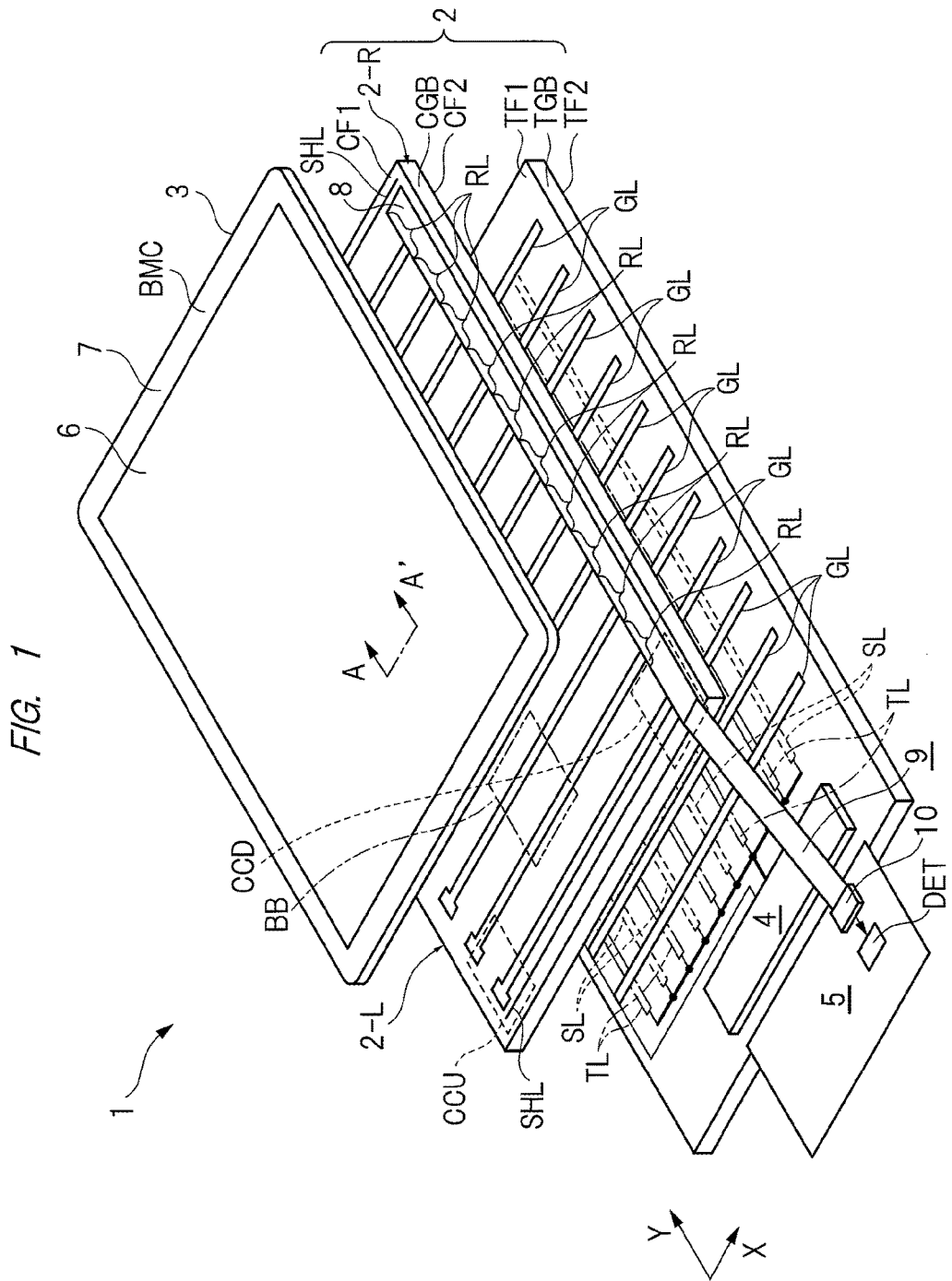
FIG. 1 is an exploded perspective view illustrating a configuration of a display device according to a first embodiment.

Hereinafter, each embodiment of the present invention will be described with reference to the drawings. Note that the disclosure is provided by way of example, and it is a matter of course that any alteration that is easily anticipated as appropriate while keeping a gist of the present invention by a person skilled in the art is included in the scope of the present invention. In addition, a width, a thickness, a shape and the like of each portion of the drawings are schematically illustrated as compared to actual aspects in order make the description clearer, but the drawings are mere examples, and do not limit the interpretation of the present invention.

In addition, the same elements as those that have been described in relation to the foregoing drawings are denoted by the same reference characters in the present specification and the respective drawings, and detailed descriptions thereof will be appropriately omitted in some cases.

(First Embodiment)
<Configuration of Display Device>

FIG. 1 is an exploded perspective view illustrating a configuration of a liquid crystal display device (hereinafter, referred to as a display device) according to the first embodiment. A display device 1 includes a display module 2 and a panel 3 which includes a display region 6 and a non-display region 7 provided to surround the display region 6. Although the display device includes a polarizing plate, the polarizing plate is not illustrated in each drawing.

The display module 2 includes an insulating thin film transistor (TFT) substrate (hereinafter, referred to also as a first substrate or a first insulating substrate) TGB and an insulating color filter (CF) substrate (hereinafter, referred to also as a second substrate or a second insulating substrate) CGB. In FIG. 1, TF1 represents a first main surface of the first substrate TGB, and TF2 represents a second main surface opposite to the first main surface TF1. In addition, CF1 represents a first main surface of the second substrate CGB, and CF2 represents a second main surface opposite to the first main surface CF1. In the description of this specification, a state in which the first main surface TF1 of the first substrate TGB and the first main surface CF1 of the second substrate CGB are seen from the side of the panel 3 is assumed as the state of being seen in a plan view. Also, in FIG. 1, an arrow assigned with a reference character Y represents a Y direction (first direction) and an arrow assigned with a reference character X represents an X direction (second direction) which crosses the Y direction.

A plurality of scan lines GL, which extend in the X direction and are arranged in parallel in the Y direction, a plurality of signal lines SL, which extend in the Y direction and are arranged in parallel in the X direction, and a plurality of drive electrodes TL, which extend in the Y direction and are arranged in parallel in the X direction, are formed on the first main surface TF1 of the first substrate TGB. Although the signal line SL and the drive electrode TL cross the scan line GL in a plan view, the scan line GL, the signal line SL, and the drive electrode TL are electrically separated from each other. A region at which each of the signal lines SL and each of the scan lines GL cross each other is configured as a subpixel region. In the first embodiment, one pixel region is configured of three subpixel regions which are arranged adjacently in the X direction in a plan view.

Each crossing region between the scan lines GL and the signal lines SL functions as the subpixel region. Accordingly, the above-described subpixel regions are arranged in a matrix form in a region of the display module 2 corresponding to the display region 6 of the panel 3, that is, a display region of the display module 2. In addition, since the pixel region is configured of three subpixel regions, the pixel regions are periodically arranged in the display region of the display module 2.

In the second substrate CGB, the second main surface CF2 of the second substrate CGB faces the first main surface TF1 of the first substrate TGB with a liquid crystal layer and a color filter (not illustrated) interposed therebetween. A plurality of detection electrodes RL, which extend in the X direction and are arranged in parallel in the Y direction, are formed on the first main surface CF1 of the second substrate CGB. In FIG. 1, a reference character 8 represents a signal wiring connected to the detection electrodes RL. The detection electrodes RL are electrically connected to a detection circuit DET that is mounted on a flexible cable 5 via the signal wiring 8, a flexible cable 9, and a connector 10. In FIG. 1, a reference character SHL represents a shield wiring which is formed on the first main surface CF1 of the second substrate CGB. The shield wiring SHL is arranged so as to surround the detection electrodes RL in a plan view in order to reduce malfunction caused by noise or the like.

In the panel 3, a light shielding film BMC is formed on a back surface of the non-display region 7. The panel 3 is mounted on the second substrate CGB so that a back surface thereof faces the first main surface CF1 of the second substrate CGB.

In FIG. 1, a reference character 4 represents a semiconductor device which is mounted on the first substrate TGB. The semiconductor device 4 is connected to the scan line GL, the drive electrode TL, and the signal line SL. The semiconductor device 4 supplies an image signal to the signal line SL via the flexible cable 5 connected to the first substrate TGB at the time of display. Then, the image signal that has been supplied to the signal line SL is supplied to a pixel electrode GED via a thin film transistor Tr in FIG. 2. In addition, the semiconductor device 4 sequentially selects the scan lines GL and supplies a drive signal for display to the drive electrode TL at the time of display. Accordingly, a liquid crystal layer in the subpixel region at a crossing portion between the selected scan line GL and the signal line SL is displaced in accordance with the image signal supplied to the pixel electrode GED. The color filter is formed in a region corresponding to the subpixel region in the second main surface CF2 of the second substrate CGB. Light that has passed through the displaced liquid crystal layer is transmitted to the display region 6 of the panel 3 via the second substrate CGB and the detection electrode RL, and is displayed as a color image.

The semiconductor device 4 supplies a drive signal for detection to the selected drive electrode TL at the time of touch detection. An electric field in accordance with a change of the drive signal for detection is generated between the detection electrode RL and the selected drive electrode TL, and a detection signal in accordance with whether an external object touches the vicinity of the selected drive electrode TL is generated in the detection electrode RL. The detection signal in the detection electrode RL is supplied to the detection circuit DET, and the touched position is extracted.

Figure 2:
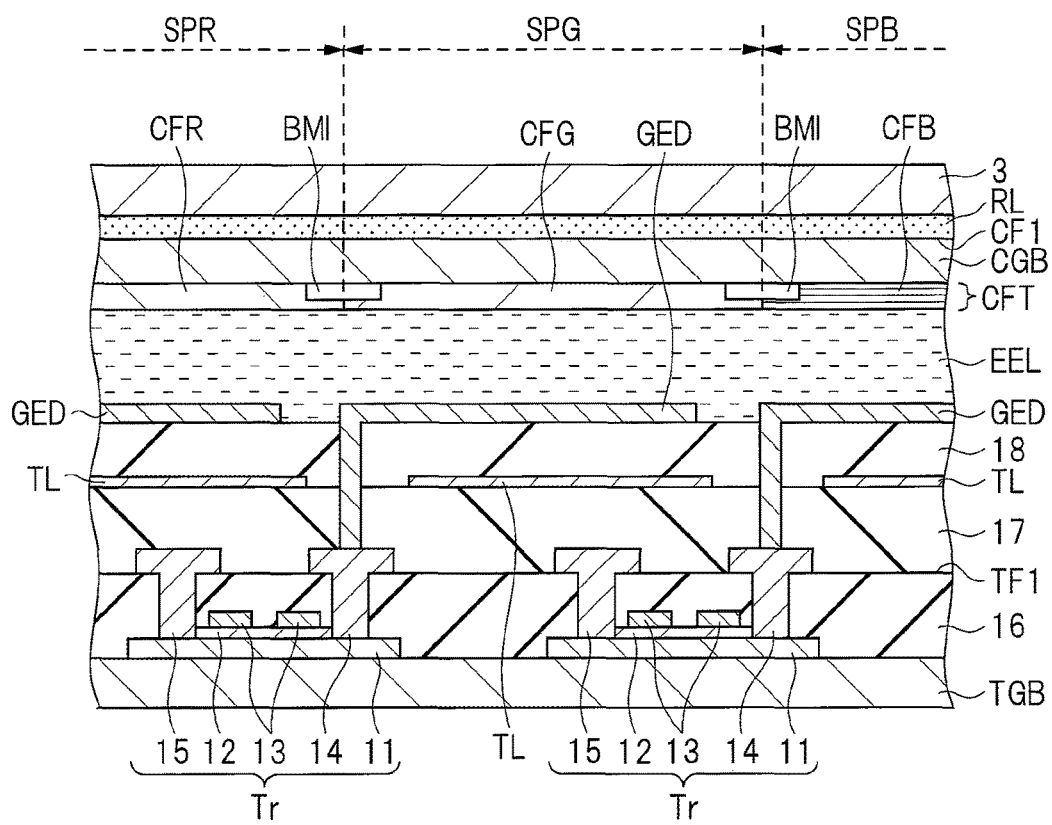
FIG. 2 is a cross-sectional view illustrating a cross section of the display device according to the first embodiment.

FIG. 2 is a cross-sectional view schematically illustrating a cross section A-A' illustrated in FIG. 1. FIG. 2 illustrates the cross section in a state where the panel 3 is stacked on the display module 2 illustrated in FIG. 1 with the liquid crystal layer and the color filter interposed therebetween.

In FIG. 2, SPR, SPG and SPB represent subpixel regions, and each of the subpixel regions SPR, SPG and SPB includes the TFT transistor Tr and a pixel electrode GED which is connected to a source electrode of the TFT transistor Tr. The TFT transistor Tr includes a polysilicon semiconductor layer 11 formed on the first main surface TF1 of the first substrate TGB, and a gate insulating film 12, a gate electrode 13, a source electrode 14 and a drain electrode 15 formed on the polysilicon semiconductor layer 11. The gate electrode 13 is connected to the scan line GL, and the drain electrode 15 is connected to the signal line SL. The drive electrode TL is arranged above the TFT transistor Tr with insulating films 16 and 17 interposed therebetween, and the pixel electrode GED is arranged above the drive electrode TL with an insulating film 18 interposed therebetween. The pixel electrode GED is connected to the signal line SL via the TFT transistor Tr when being selected by the scan line GL, and the image signal is supplied thereto.

A liquid crystal layer EEL and a color filter CFT are arranged in this order above the pixel electrode GED, the second substrate CGB is arranged above the color filter CFT, and the detection electrode RL is formed on the first main surface CF1 of the second substrate CGB. Further, the panel 3 is mounted above the detection electrode RL.

The color filter CFT includes four types of filters in the first embodiment. Namely, the color filter CFT includes a green (first color) filter CFG, a blue filter CFB, a red (third color) filter CFR, and a white (second color) filter CFW. In the subpixel region, a corresponding filter is arranged above the pixel electrode GED and passes the light of the corresponding color among the light from the liquid crystal layer EEL. For example, the subpixel region SPG including the filter CFG passes the light of green among the light from the liquid crystal layer EEL. The same is true for the other subpixel regions SPB, SPR and SPW including the filters CFB, CFR and CFW, respectively. Since each of the subpixel regions passes the light of the color corresponding to the color of the arranged filter, the subpixel region SPG can be considered as a green (first color) subpixel region (first subpixel region), and the subpixel region SPB can be considered as a blue subpixel region. In addition, the subpixel region SPR can be considered as a red (third color) subpixel region (third subpixel region), and the subpixel region SPW can be considered as a white (second color) subpixel region (second subpixel region).

In FIG. 2, a reference character BMI represents a light shielding film (referred to also as a black matrix) provided between adjacent filters. In addition, in FIG. 1, reference characters 2-R and 2-L represent long sides of the display module 2.

<Overview of Subpixel Region and Detection Electrode>

Next, a relationship between the subpixel region and the detection electrode will be described while taking a display region BB surrounded by a broken line in FIG. 1 as an example. FIG. 3 is a plan view of a display module according to the first embodiment and corresponds to a plan view illustrating the display region BB in an enlarged manner. FIG. 3A is a plan view of the subpixel region arranged in the display region BB, and FIG. 3B is a plan view of the detection electrode arranged in the display region BB.

In FIG. 3A, a broken-line block filled with right-down lines represents the red subpixel region SPR, and a broken-line block filled with right-up lines represents the green subpixel region SPG. Similarly, a broken-line block filled with horizontal lines represents the blue subpixel region SPB, and a broken-line block filled with right-up lines and right-down lines represents the white subpixel region SPW. In this specification, the subpixel regions of respective colors are illustrated in the same expression method also when the subpixel regions are illustrated in other drawings. Note that reference characters are attached only to the subpixel regions on the first row arranged along the X direction in FIG. 3A in order to avoid complexity of the drawing.

In the first embodiment, one pixel region is configured of three subpixel regions arranged adjacently in the X direction. In FIG. 3A, the region surrounded by a one-dot chain line represents the pixel region. This one-dot chain line can be considered to represent the light shielding film that surrounds the three subpixel regions. In addition, two types of pixel regions are arrayed in the display region BB depending on combinations of subpixel regions in the first embodiment. Namely, these are a first pixel region PixB in which the subpixel regions SPR, SPG and SPB are arranged in this order in the X direction and a second pixel region PixW in which the subpixel regions SPR, SPG and SPW are arranged in this order in the X direction. In the first pixel region PixB, the blue subpixel region SPB is arranged next to the green subpixel region SPG. On the other hand, the white subpixel region SPW is arranged next to the green subpixel region SPG instead of the blue subpixel region SPB in the second pixel region PixW. By using the white subpixel region SPW instead of the blue subpixel region SPB in this manner, the improvement of brightness is achieved.

The subpixel regions SPR, SPG, SPB and SPW are arrayed in the X direction in both the first pixel region PixB and the second pixel region PixW. Namely, an array direction SPD of the subpixel regions is the X direction. In the following description, the first pixel region PixB and the second pixel region PixW are simply referred to also as the pixel regions in the case where there is no need of distinguishing the first pixel region and the second pixel region.

The first pixel region PixB and the second pixel region PixW are alternately arranged in each of the X direction and the Y direction as illustrated in FIG. 3A. Namely, the first pixel region PixB and the second pixel region PixW are alternately arrayed in the X direction, and further, alternately arrayed in the Y direction.

Each of the scan lines GL is connected to a plurality of subpixel regions which extend in the X direction and are arranged in the same row. In addition, each of the signal lines SL is connected to subpixel regions which extend in the Y direction and are arranged in the same column. In the first pixel region PixB and the second pixel region PixW arranged in the same column, the green (first color) subpixel regions SPG are connected to the same signal line SL, the red subpixel regions SPR are also connected to the same signal line SL, and the blue (third color) subpixel region SPB and the white (second color) subpixel region SPW are connected to the same signal line SL. Thus, in a plan view, the plurality of green subpixel regions SPG are arrayed in the Y direction crossing the X direction in which the detection electrode RL extends, in the display region. Similarly, the plurality of red subpixel regions SPR are also arrayed in the Y direction in the display region, and the blue (third color) subpixel region SPB and the white (second color) subpixel region SPW are also arrayed in the Y direction in the display region.

In a plan view, the detection electrode RL includes a first region RLP, and a conductive pattern CP (non-detection electrode) includes a second region RLN. The detection electrode RL and the conductive pattern CP extend in the X direction so as to overlap the plurality of first pixel regions PixB and second pixel regions PixW. Next, a structure of the detection electrode RL will be described with reference to FIG. 3B. FIG. 3B illustrates the two detection electrodes RL.

A plurality of circular first patterns PT are formed in the first region RLP and the second region RLN in a plan view. A conductive film, for example, an indium tin oxide (ITO) film, which has a high light transmittance and forms the detection electrode, is arranged in the X direction in the first region RLP. In this ITO film, non-formation regions in which the ITO film (conductive film) is not formed are formed as the circular first patterns PT. The first region RLP is electrically connected to the detection circuit DET illustrated in FIG. 1. On the other hand, a plurality of ITO films each of which forms the detection electrode are formed as the circular first patterns PT in the second region RLN. In other words, it is possible to consider that a plurality of formation regions corresponding to the plurality of first patterns PT are present in the second region RLN, and the ITO film (conductive film) is formed in each of the formation regions. The second region RLN is separated from the detection electrode, and is electrically separated from the detection circuit DET. In FIG. 3B, the formation region in which the ITO film is formed is filled with dots, and no dot is applied to the non-formation region. Hereinafter, the conductive film is described by the name of the ITO film in some cases. However, a material of the conductive film is not limited to the ITO, and may be different metal or metal oxide.

In FIG. 3B, a reference character ILP represents a virtual straight line (hereinafter, referred to also as a virtual line) which connects center points of the first patterns PT adjacent to each other among the plurality of first patterns PT formed in the first region RLP. Similarly, a reference character ILN represents a virtual line which connects center points of the first patterns PT adjacent to each other among the plurality of first patterns PT formed in the second region RLN. The virtual lines ILP and ILN extend in the X direction, and the plurality of first patterns PT are formed along the virtual lines ILP and ILN. In addition, a reference character BDL represents a boundary between the first region RLP and the second region RLN and extends in the X direction. Note that the virtual lines ILP and ILN are the virtual straight lines each of which connects the center points of the first patterns PT which are the closest to each other.

As described above, the subpixel region array direction SPD is the X direction, and the first patterns PT in the first region RLP and the second region RLN of the detection electrode are also formed along the virtual lines ILP and ILN which extend in the X direction. Accordingly, an array direction of the plurality of first patterns PT is also the X direction. Namely, the subpixel region array direction SPD and the array direction of the first patterns PT are the same. From a different viewpoint, when the adjacent pixel regions which are arrayed in the Y direction are seen, for example, the green (first color) subpixel regions SPG are arrayed in the Y direction. Thus, an array direction of the subpixel regions of the same color (the first color) (hereinafter, referred to also as a same color subpixel array direction) SSD and the array direction of the plurality of first patterns PT cross each other. In the pixel regions arrayed in the Y direction, the subpixel regions of the same color, for example, the green subpixel regions SPG are connected to the same signal line SL. Thus, in this embodiment, the same color subpixel array direction SSD can be considered as the Y direction in which the signal line SL extends.

The region in which the first pattern PT is formed and the region in which the first pattern PT is not formed are different in, for example, light transmittance in the first region RLP and the second region RLN of the detection electrode RL. In the first embodiment, the virtual lines ILP and ILN each of which connects the center points of the first patterns PT adjacent to each other extend in the direction crossing the same color subpixel array direction SSD (that is, the extending direction of the signal line SL). Accordingly, it is possible to prevent a specific same color from being highlighted, and thus possible to reduce the moire to be described later.

<Configuration of Detection Electrode>

Next, a specific configuration of the detection electrode RL will be described. FIG. 4 is a plan view illustrating the configuration of the detection electrode RL according to the first embodiment. FIG. 4A is a plan view of the detection electrode RL and the conductive pattern CP in the state of overlapping the pixel regions PixB and PixW arrayed in the display region, and FIG. 4B is a plan view illustrating the state where the pixel regions PixB and PixW have been removed from FIG. 4A. The pixel regions PixB and PixW are periodically arranged so as to form a matrix in the display region. In FIG. 4A, a reference character PPX represents a pitch between centers of the pixel regions adjacent to each other and arrayed in the X direction (hereinafter, referred to also as an X direction pixel pitch). In addition, a reference character PPY represents a pitch between centers of the pixel regions adjacent to each other and arrayed in the Y direction (hereinafter, referred to also as a Y direction pixel pitch). In FIG. 4A, a reference character PTR represents a first pattern that is overlapped on the red subpixel region SPR, the green subpixel region SPG, and the blue subpixel region SPB, among the plurality of first patterns PT.

In FIG. 4B, a reference character CTP represents a center point of the circular first pattern PT in a plan view. Virtual equilateral triangles IRT illustrated by broken lines spread on the first region RLP and the second region RLN, which form the detection electrode RL, and the first patterns PT are arranged so that the center point CTP of the first pattern PT overlaps each vertex of the virtual equilateral triangles IRT. The first patterns PT arrayed in the first region RLP and the second region RLN will be described with reference to FIG. 5.

Figure 5A:
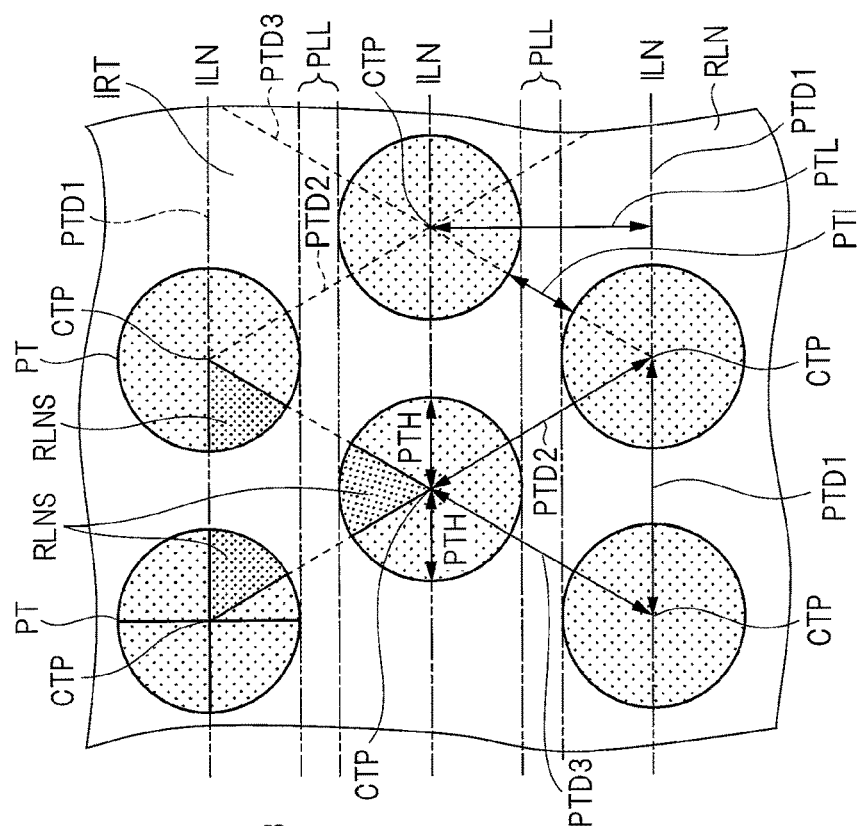
FIG. 5A is a plan view illustrating the detection electrode according to the first embodiment.
Figure 5B:
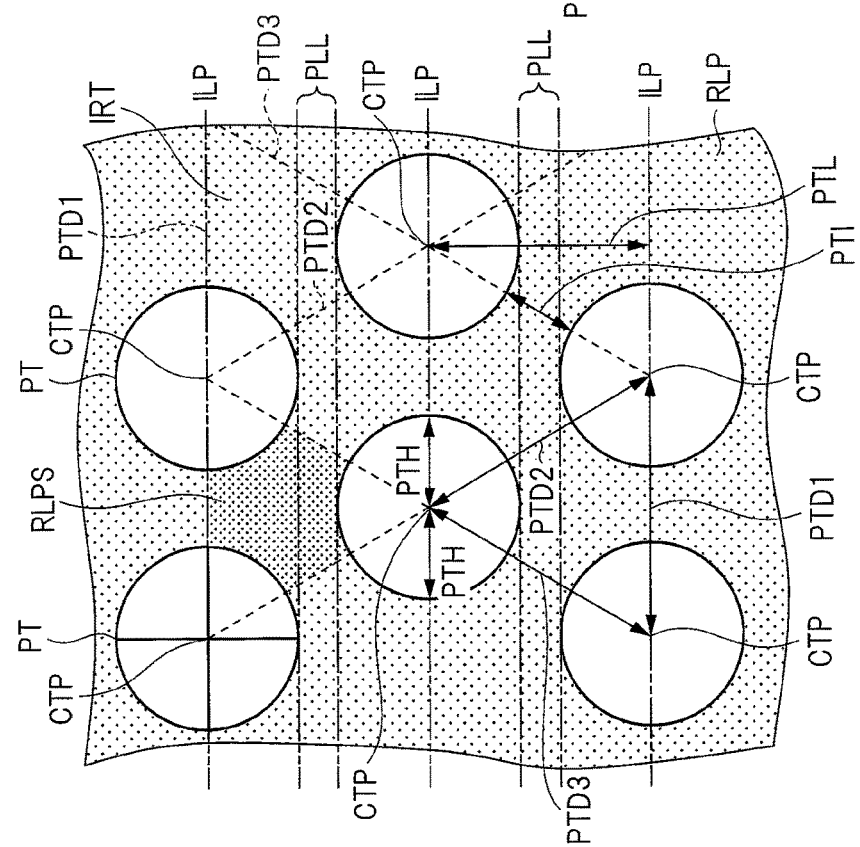
FIG. 5B is a plan view illustrating the detection electrode according to the first embodiment.

FIG. 5 is a plan view of the detection electrode according to the first embodiment. FIG. 5A is a plan view of the first region RLP, and FIG. 5B is a plan view of the second region RLN.

In FIG. 5A, sides PTD1 to PTD3 of each of the virtual equilateral triangles IRT have the same length. In a plan view, the plurality of virtual equilateral triangles IRT are arrayed in the first region RLP so that the one side PTD1 of the virtual equilateral triangle IRT extends in a direction crossing the same color subpixel array direction SSD, that is, the direction (X direction) crossing the signal line SL.

The first patterns PT are arranged so that the center point CTP of the first pattern PT overlaps each vertex of the virtual equilateral triangles IRT arrayed in the first region RLP. Accordingly, the virtual line ILP connecting the center points CTP of the first patterns PT adjacent to each other extends in the X direction. In FIG. 5A, a reference character PTH represents a radius of the first pattern PT, a reference character PTI represents a distance between the first patterns PT, and a reference character PTL represents a distance between the virtual lines ILP.

Herein, the distance PTI indicates a distance between outer circumferences of the first patterns PT, and the sides PTD1 to PTD3 indicate each pitch between the first patterns PT adjacent to each other. Hereinafter, the pitch between the first patterns PT adjacent to each other is referred to also as a pattern pitch PTD.

Since the non-formation region in which the conductive film (ITO film) is not formed is the first pattern PT in the first region RLP, the conductive film is not formed on the inner side of the first pattern PT, and the conductive film is formed on the outer side of the first pattern PT. The first patterns PT are arranged so that the center point CTP overlaps each vertex of the virtual equilateral triangles IRT each having the one side PTD1 arranged to cross the subpixel array direction SSD. Thus, a region PLL in which the first pattern PT is not arrayed is formed between rows of the first patterns PT adjacent to each other in the Y direction, and the conductive film is formed in the region PLL.

Although the first region RLP has been described by way of example, the first patterns PT are arranged so that the center point CTP of the first pattern PT overlaps each vertex of the virtual equilateral triangles IRT in the same manner also in the second region RLN. A different point from the first region RLP is that the conductive film (ITO film) is formed on the inner side of the first pattern PT and the conductive film is not formed on the outer side of the first pattern PT in the second region RLN.

The area of the conductive film per unit area in the first region RLP and the area of the conductive film per unit area in the second region RLN are made equal to each other so as not to cause the difference in display characteristics between the first region RLP and the second region RLN. Namely, the area of a region RLPS (region with dark dots) remaining after subtracting overlapping regions between the virtual equilateral triangle IRT and the first patterns PT from the virtual equilateral triangle IRT in FIG. 5A is made equal to a total area RLNS (regions with dark dots) of the overlapping regions between the virtual equilateral triangle IRT and the first patterns PT in FIG. 5B.

<Reduction of Moire Generation>

The moire is generated when the same color subpixel array direction SSD and the array direction of the first patterns PT formed in the detection electrode described in FIGS. 3A and 3B match each other. With respect to this, the same color subpixel array direction SSD and the array direction of the first patterns PT cross each other in the first embodiment, and it is thus possible to reduce the generation of moire.

FIG. 13 is an explanatory diagram for describing the generation of moire. FIG. 13A is a plan view obtained when the second region RLN in the detection electrode RL is seen in a plan view. The array of the subpixel regions SPR, SPG and SPB (SPW) is arranged in the X direction. The same color subpixel array direction SSD of the green subpixel region SPG, for example, is the Y direction like in FIG. 3. Meanwhile, the first patterns PT are arrayed so that the center point of the first pattern PT overlaps each vertex of the virtual equilateral triangles IRT illustrated by a broken line in FIG. 13A. In FIG. 13A, the side PTD1 of the virtual equilateral triangle IRT is not arranged in the direction crossing the subpixel array direction SSD, but is arranged in a direction parallel to the signal line SL (Y direction) unlike in FIGS. 4 and 5. Accordingly, the same color subpixel array direction SSD, that is, the extending direction of the signal line SL and the array direction of the first patterns PT match each other. Also in FIG. 13A, a reference character ILN represents the virtual line ILN which connects the center points of the plurality of first patterns PT adjacent to each other.

The array of the first patterns PT in which the extending direction of the signal line SL and the extending direction of the virtual line ILN connecting the center points of the first patterns PT are parallel to each other as illustrated in FIG. 13A is hereinafter referred to also as a signal line parallel pattern. On the other hand, the array of the first patterns PT in which the extending direction of the signal line SL and the extending direction of the virtual lines ILP and ILN connecting the center points of the first patterns PT cross each other as illustrated in FIGS. 5A and 5B is hereinafter referred to also as a signal line cross pattern.

When the first patterns adjacent to each other are arranged along the virtual line ILN extending in the Y direction as illustrated in FIG. 13A, a region in which the first pattern PT is not arranged extends in the Y direction. FIG. 13B is a diagram schematically illustrating the region in which the first pattern PT is arranged and the region in which the first pattern PT is not arranged. In FIG. 13B, the region in which the first pattern PT is arranged is denoted by a reference character ITY, and the region in which the first pattern PT is not arranged is denoted by a reference character ITN. Since FIG. 13A illustrates the second region RLN, the region ITY represents the region in which the ITO film is formed on the second substrate CGB, and the region ITN represents the region in which the ITO film is not formed in FIG. 13B.

In the region ITN in which the ITO film is not formed, the transmittance is higher compared with the region ITY in which the ITO film is formed. Thus, the color of the subpixel region overlapping the region ITN in which the ITO film is not formed is visually confirmed in a more highlighted manner than the color of the subpixel region overlapping the region ITY, among the subpixel regions arrayed in the display region in a plan view. Since the array direction of the subpixel regions of the same color and the array direction of the first patterns are the same, the same color is visually confirmed from the region ITN. FIG. 13A illustrates a state where the array of the green subpixel regions SPG overlaps the regions ITN. Thus, green G is visually confirmed from each of the regions ITN continuously present, and the moire is generated as illustrated in FIG. 13C.

In FIG. 13, the regions ITN are arrayed so as to overlap the subpixel regions SPG. However, if the regions ITN overlap the subpixel region SPB or SPR, blue or red moire is generated. Note that luminance or brightness of green is higher than luminance or brightness of red and blue in the case of seeing the colors from the subpixel regions SPR, SPG, SPB and SPW. Accordingly, the green moire is more likely to be generated than the red or blue moire. Further, the white subpixel region SPW improves luminance of an adjacent subpixel region in fact. Thus, the moire is more remarkably generated when the other subpixel regions (red, blue, green) adjacent to the white subpixel region SPW overlaps the region ITN. In addition, although the second region RLN has been described by way of example in FIG. 13, the moire is similarly generated also in the first region RLP, and the moire having a plaid pattern is generated. As described above, it is necessary to take the measures for the moire disclosed in this specification to a region in which the moire is likely to be generated.

FIG. 6 is a plan view of the display region in the case where the first patterns PT are arrayed so that the center points of the first patterns PT overlap the virtual lines ILN extending in the X direction as described with reference to FIG. 5. Namely, FIG. 6 illustrates the case where the first patterns PT are arrayed in the signal line cross pattern. FIG. 6A illustrates the second region RLN of the detection electrode RL in which the plurality of first patterns PT are arrayed. The same color subpixel array direction SSD is the Y direction like in FIG. 3. The virtual equilateral triangle IRT is arranged so that the one side PTD1 crosses the signal line SL, and the first pattern PT is arrayed so that the center point of the first pattern PT overlaps the vertex of the virtual equilateral triangle IRT. Thus, the virtual line ILN connecting the center points of the first patterns PT adjacent to each other extends in the X direction. As a result, the same color subpixel array direction SSD and the array direction of the adjacent first patterns PT cross each other.

Accordingly, it is possible to prevent the region in which the first pattern PT is arranged and the region in which the first pattern PT is not arranged from being generated in the X direction as described with reference to FIG. 13. Namely, it is possible to prevent the region in which the first pattern PT is not arranged from extending in the Y direction. As a result, it is possible to prevent the subpixel regions of the same color and the region in which the first pattern PT is not arranged from overlapping each other, and thus possible to reduce the generation of moire.

Since the first patterns PT are arrayed along the virtual line ILN extending in the X direction, the region ITY in which the first pattern PT is arranged and the region ITN in which the first pattern PT is not arranged are generated in the Y direction as illustrated in FIG. 6B. Namely, the region in which the first pattern PT is not arranged extends in the X direction. In this case, for example, the region ITY where the transmittance becomes higher overlaps the subpixel regions SPR, SPG, SPB and SPW. Accordingly, a color to be visually confirmed through the region ITY becomes a composite color of the colors of these subpixel regions. As a result, even if the region ITY and the region ITN are generated in the Y direction, the subpixel regions of the same color are dispersed, and it is thus possible to reduce the generation of moire. Note that the region ITY illustrated in FIG. 6B corresponds to the region PLL illustrated in FIG. 5B.

Although the fact that the generation of moire can be reduced has been described while taking the second region RLN as an example with reference to FIG. 6, it is also possible to reduce the generation of moire also in the first region RLP in the same manner.

In the first embodiment, the X direction pixel pitch PPX and the Y direction pixel pitch PPY described above are set to the same length. Thus, the X direction pixel pitch PPX and the Y direction pixel pitch PPY are collectively referred to as a pixel pitch PPD. By optimizing the pixel pitch PPD and the above-described pattern pitch, for example, the region ITN illustrated in FIG. 6B can be reduced, so that it is possible to further reduce the generation of moire.

<Pixel Pitch PPD and Pattern Pitch PTD>

The present inventor has evaluated the generation of moire while changing the pixel pitch PPD and the pattern pitch PTD for each of the signal line parallel pattern and the signal line cross pattern. FIG. 7A to 7C are tables illustrating results of the evaluation. FIG. 7A illustrates the case of the signal line cross pattern, and FIG. 7B illustrates the case of the signal line parallel pattern. In the evaluation, the generation of moire was evaluated by changing the pixel pitch PPD to 42.83 µm, 49.28 µm, 63.00 µm, 65.70 µm, 74.05 µm, 74.85 µm, and 75.00 µm, and changing the pattern pitch PTD to 50.5 µm, 54.5 µm, 58.0 µm, 62.0 µm, 66.0 µm, and 77.0 µm for each of the pixel pitches PPD. The evaluation results are shown as evaluation values at crossing portions between the pixel pitch PPD and the pattern pitch PTD in each of FIGS. 7A and 7B. Herein, a smaller evaluation value indicates that the generation of moire is reduced more.

As illustrated in FIG. 7B, the evaluation value is "1" when the pattern pitch is 58.0 µm in Examples 10 and 11 in the signal line parallel pattern. On the other hand, the state where the evaluation value is "1" is present in each of Examples 3 to 7 in the signal line cross pattern. Namely, the generation of moire is reduced more in the signal line cross pattern than in the signal line parallel pattern. In addition, the generation of moire is reduced more in the signal line cross pattern than in the signal line parallel pattern even when the comparison is made under the same pitch condition.

FIG. 7C shows a pitch ratio (=PTD/PPD) between the pattern pitch PTD and the pixel pitch PPD in each of Examples 1 to 7 illustrated in FIG. 7A. For example, a pitch ratio (77.0/42.83≈1.80) is described in a section in which the pattern pitch PTD is 77.0 µm in Example 1. When the pitch ratio (FIG. 7C) of the case where the evaluation value is "1" in FIG. 7A is seen, it is understood that the pitch ratio higher than 0.8 and lower than 0.95 is suitable to reduce the generation of moire. In other words, it is desirable that the pattern pitch PTD is set to be higher than 0.8 times and lower than 0.95 times the pixel pitch PPD for the reduction of the generation of moire.

<Array of Detection Electrodes>

Figure 8:
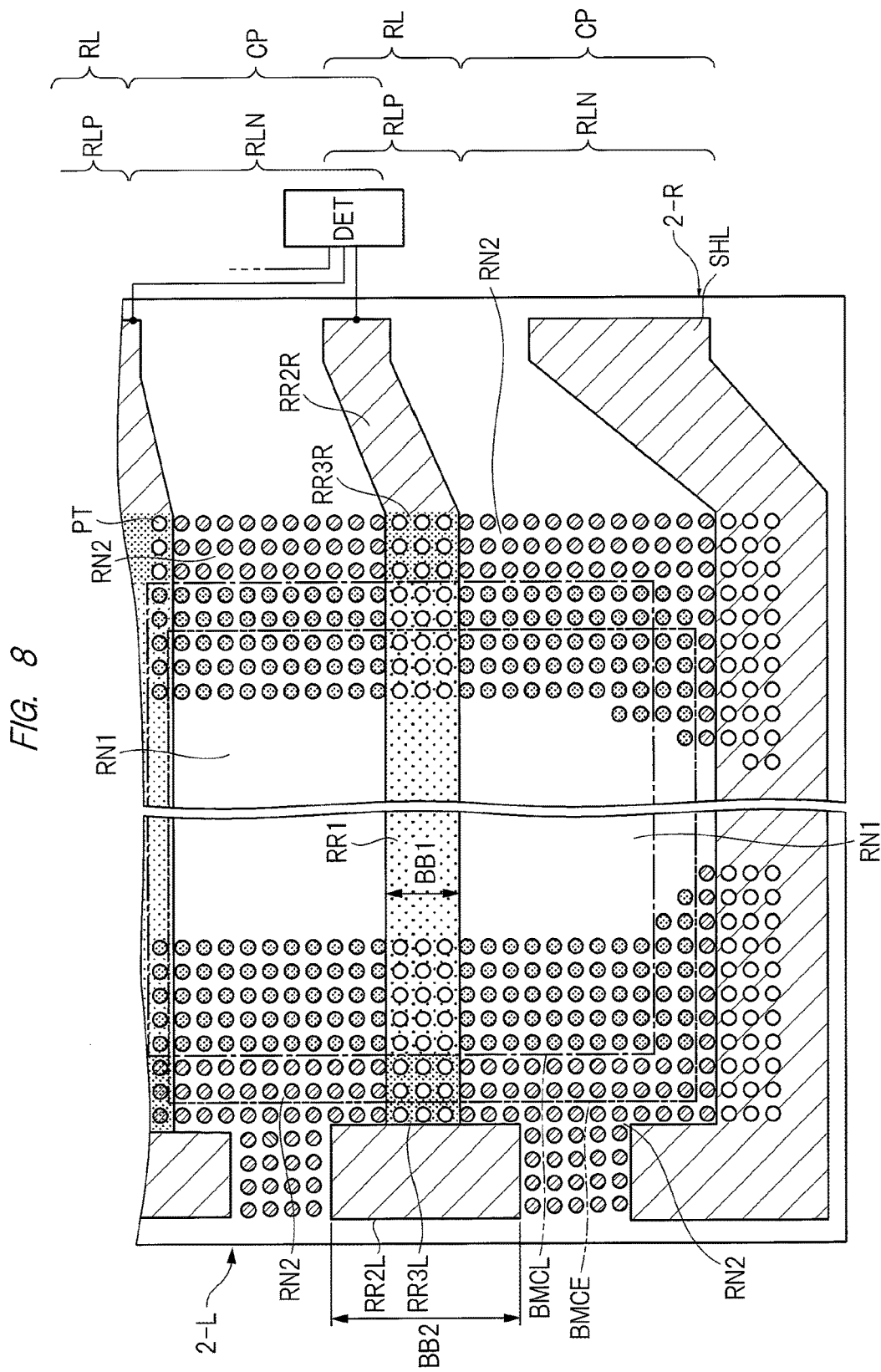
FIG. 8 is a plan view illustrating an array of the detection electrode according to the first embodiment.

FIG. 8 is a plan view illustrating the array of the detection electrodes RL. FIG. 8 illustrates the plan view of regions indicated by broken lines CCU and CCD in FIG. 1.

Also in FIG. 8, a circular mark ○ represents the first pattern forming the detection electrode RL, and a reference character PT is attached only to the one first pattern in FIG. 8 in order to avoid the complexity of the drawing. As described above, the detection electrode RL is configured of a conductive film such as the ITO film and includes the first region RLP in which the plurality of first patterns PT are arrayed. The conductive pattern CP includes the second region RLN in which the plurality of first patterns each of which is formed of the ITO film are arrayed. Herein, the first region RLP can be considered as an electrode in which a plurality of openings each of which has a shape of the first pattern PT are provided in an electrode of the conductive film (ITO film) formed on the first main surface CF1.

When the panel 3 is mounted on the display module 2 as illustrated in FIG. 1, the peripheral region of the second substrate CGB is covered by the light shielding film BMC formed on a back surface of the non-display region 7 in a plan view. In other words, the light shielding film is overlapped on the peripheral region. In FIG. 8, a boundary line between the region covered by the light shielding film BMC and the region that is not covered by the light shielding film BMC is indicated by a one-dot chain line BMCL. The region on the inner side of the one-dot chain line BMCL serves as the display region, and a region on the outer side that surrounds the display region serves as the non-display region (peripheral region).

In the first embodiment, the first region RLP forming the detection electrode RL includes a first detection region (first region), which is arranged in the display region, and a second detection region (third region) and a third detection region (fifth region), which are arranged in the peripheral region, in a plan view. In FIG. 8, a region RR1 filled with thin dots represents the first detection region, regions RR3R and RR3L filled with dark dots represent the third detection region, and regions RR2R and RR2L filled with right-down lines represent the second detection region.

The display module 2 has two long sides 2-R and 2-L which oppose each other as illustrated in FIG. 1. The detection electrode RL is arranged in the X direction between the long sides 2-R and 2-L. The second detection region RR2R is arranged in the vicinity of the long side 2-R, and the second detection region RR2L is arranged in the vicinity of the long side 2-L. In addition, the third detection region RR3R is arranged between the first detection region RR1 and the second detection region RR2R, and the third detection region RR3L is arranged between the first detection region RR1 and the second detection region RR2L. In other words, the second detection regions (third regions) RR2R and RR2L and the third detection regions (fifth regions) RR3R and RR3L are arranged in the peripheral region on the outer side of the first detection region (first region) RR1, and the third detection regions (fifth regions) RR3R and RR3L are arranged between the first detection region (first region) RR1 and the second detection regions (third regions) RR2R and RR2L.

Although not particularly limited, the first detection region RR1, the second detection regions RR2R and RR2L, and the third detection regions RR3R and RR3L are integrally formed of the same conductive film (ITO film), and the plurality of first patterns PT are arrayed so as to have the signal line cross pattern in each of the first detection region RR1 and the third detection regions RR3R and RR3L.

Meanwhile, the first pattern PT is not formed in the second detection regions RR2R and RR2L. In addition, the second detection region RR2R is connected to the detection circuit DET described in FIG. 1, and the second detection region RR2L has a width BB2 larger than a width BB1 of the first detection region RR1. In a plan view, the first detection region RR1, the second detection region RR2L, and the third detection region RR3L have a T shape. A test terminal for measurement is brought into contact with the second detection region RR2L at the time of measuring an electric resistance of the detection electrode RL, for example. Since the width BB2 is set to be larger than the width BB1, the contact of the test terminal is easy. When it is unnecessary to measure the electric resistance of the detection electrode RL, for example, the second detection region RR2L may be configured to be similar to the third detection region RR3L.

The second region RLN which is the conductive pattern CP adjacent to the detection electrode RL includes a first non-detection region (second region) RN1 arranged in the display region and a second non-detection region (fourth region) RN2 arranged in the peripheral region. In other words, the second non-detection region (fourth region) RN2 is arranged on the outer side of the first non-detection region (second region) RN1. In the second region RLN, the plurality of first patterns PT formed of the conductive film (ITO film) are arrayed on the first main surface CF1 of the second substrate CGB. In FIG. 8, the first patterns PT arrayed in the first non-detection region RN1 are filled with dark dots to be explicitly illustrated. In addition, the first patterns PT arrayed in the second non-detection region RN2 are filled with right-down lines to be explicitly illustrated.

In the first embodiment, although not particularly limited, the second non-detection region RN2 is present also between the second detection regions RR2L in the peripheral region of the detection electrode RL, and the plurality of first patterns PT are arrayed therein in a plan view as illustrated in FIG. 8.

In FIG. 8, a reference character SHL represents a shield wiring, and the conductive film (ITO film) is formed in the shield wiring SHL. The plurality of first patterns PT are arrayed in the conductive film so as to have the signal line cross pattern. Namely, openings each of which has the shape of the first pattern PT are formed to have the signal line cross pattern also in the shield wiring SHL. The second non-detection region RN2 is present also between the detection electrode RL and the shield wiring SHL adjacent thereto, and the plurality of first patterns PT are arrayed therein.

For example, when a mounting position of the panel 3 is dislocated at the time of mounting the panel 3 illustrated in FIG. 1, so that the boundary line BMCL between the region covered by the light shielding film BMC and the region that is not covered by the light shielding film BMC is changed to a boundary line BMCE illustrated in FIG. 8, there is a possibility that a difference in reflection appearance is caused from an inner end of the non-display region 7 of the panel 3 unless the third detection regions RR3R and RR3L and the second non-detection region RN2 are present in the peripheral region arranged to surround the display region. In this regard, the third detection regions RR3R and RR3L and the second non-detection region RN2 in which the first patterns PT are arrayed are provided as illustrated in FIG. 8. Accordingly, even if the mounting position of the panel 3 is dislocated, it is possible to reduce the generation of the difference in reflection appearance because of the presence of the first patterns PT.

Further, since the second non-detection region RN2 in which the first patterns PT are arrayed is arranged between the second detection regions RR2L adjacent to each other and between the second detection region RR2L and the shield wiring SHL, the second non-detection region RN2 can function to shield an electric field from the periphery of the panel 3.

When the first patterns PT are arrayed in the above-described signal line parallel pattern in the first region RLP and/or the second region RLN, for example, there is a case where a size of the first pattern PT is changed due to a variation in manufacturing. In this case, the moire is remarkably generated. Specifically, in the second region RLN, for example, an overlapping amount between the plurality of subpixel regions (SPG) of the single color (for example, green) and the first patterns PT is changed in accordance with the change of the size of the first pattern PT in a plan view, and thus, only the light transmittance of the specific color is remarkably changed. As a result, there is a possibility that moire of the single color is remarkably generated. In this regard, when the first patterns PT are arrayed in the signal line cross pattern as described in the first embodiment, overlapping amounts between the subpixel regions of respective colors (for example, red, blue, and green) and the first patterns PT are changed. As a result, it is possible to prevent a remarkable change of only a specific single color. Consequently, it is possible to reduce the moire caused due to the variation in manufacturing.

In addition, the first patterns PT have a relationship of positive and negative between the first region RLP and the second region RLN. Namely, the first pattern PT becomes the non-formation region in which the conductive film is not formed in the first region RLP, and becomes the formation region in which the conductive film is formed in the second region RLN. When a size of the non-formation region is changed due to a variation in manufacturing, a size of the formation region is changed in the opposite direction. For example, when the size of the non-formation region increases due to the variation in manufacturing, the size of the formation region decreases.

It is assumed that the variation in manufacturing occurs in a case where the first patterns are arrayed in the signal line parallel pattern in the first region RLP and the second region RLN. In this case, there is a possibility that the moire becomes remarkable in each of the first region RLP and the second region RLN. Meanwhile, in a case where the first patterns are arrayed in the signal line cross pattern, it is possible to achieve the reduction of moire in each of the first region RLP and the second region RLN for the reasons described above.

In the first embodiment, the two types of the pixel regions (first pixel region PixB and second pixel region PixW) are arrayed to form the display region. Namely, the display region is configured to include not only the first pixel region PixB having the subpixel regions SPR, SPG and SPB, which respectively correspond to the three primary colors, but also the second pixel region PixW having the white subpixel region SPW. When the white subpixel region SPW is lit up (light from the backlight is caused to pass therethrough), luminance of pixels in the periphery of the white subpixel region SPW increases. Thus, when the first patterns PT are arranged in the signal line parallel pattern, the moire is likely to be generated in the green subpixel region SPG and the red subpixel region SPR extending in the Y direction in FIG. 4. In this regard, the first patterns PT are arrayed in the signal line cross pattern in the first embodiment, and it is thus possible to prevent the adjacent color from being highlighted due to the white subpixel region SPW. In addition, when the white subpixel region SPW is provided like in the first embodiment, the image display can be performed while decreasing luminance of the backlight, and it is thus possible to reduce of the power consumption. As a result, it is possible to reduce the generation of moire while reducing the power consumption in the display device according to the first embodiment including the white subpixel region SPW.

In addition, the green subpixel region SPG and the white subpixel region SPW are adjacent to each other in the second pixel region PixW in the first embodiment. Green has a higher brightness value than red and blue. Green with the high brightness is likely to be visually confirmed as the moire. Green is more likely to be visually confirmed as the moire when the white subpixel region SPW and the green subpixel region SPG are adjacent to each other, but since it is possible to suppress green and/or white from being highlighted according to the first embodiment, it is possible to reduce the generation of moire.

The virtual equilateral triangle IRT used in this specification represents a virtual equilateral triangle for determining the array of the first patterns PT as understood from its own term, and the virtual lines ILP and ILN also represent virtual lines that virtually connect the first patterns PT to each other.

Although the configuration in which the first patterns PT are arrayed so that the center point CTP of the first pattern PT overlaps each vertex of the virtual equilateral triangles IRT has been described in FIG. 4, the IRT is not limited to the virtual equilateral triangle, and may be a virtual isosceles triangle in which one side is arranged in the direction crossing the subpixel array direction SSD (signal line SL). In the case of the virtual isosceles triangle, a bottom side facing a vertex angle is arranged so as to cross the subpixel array direction SSD. Further, the IRT may be a virtual polygon having odd sides whose one side is arranged so as to cross the subpixel array direction SSD, instead of the virtual triangle.

In addition, the case in which the first pattern PT has a circular shape in a plan view has been described in the first embodiment, but the first pattern PT may have a polygonal shape in a plan view.

The one side PTD1 of the virtual equilateral triangle IRT and the virtual lines ILP and ILN are desirably orthogonal to the extending direction of the signal line SL (same color subpixel array direction SSD) in the first embodiment, but may cross the extending direction of the signal line SL with an inclination. Thus, the term "cross" is used in this specification in order to include the case of being "orthogonal".

(Second Embodiment)

In the first embodiment, the first pattern PT arrayed in the first region RLP and the first pattern PT arrayed in the second region RLN have the circular shape in a plan view. Thus, reflection is the same regardless of an incident direction of light. Namely, it is possible to eliminate directivity. In addition, the area of the conductive film (ITO film) per unit area is set to be the same between the first region RLP and the second region RLN. Accordingly, it is possible to reduce the generation of the difference in the reflection appearance between the first region RLP and the second region RLN.

However, a difference occurs in the area of the conductive film per unit area in a region BDR of a boundary (hereinafter, referred to also as a boundary region) between the first region RLP and the second region RLN. In addition, the directivity appears when a large linear region is present in the boundary region BDR.

Figure 9:
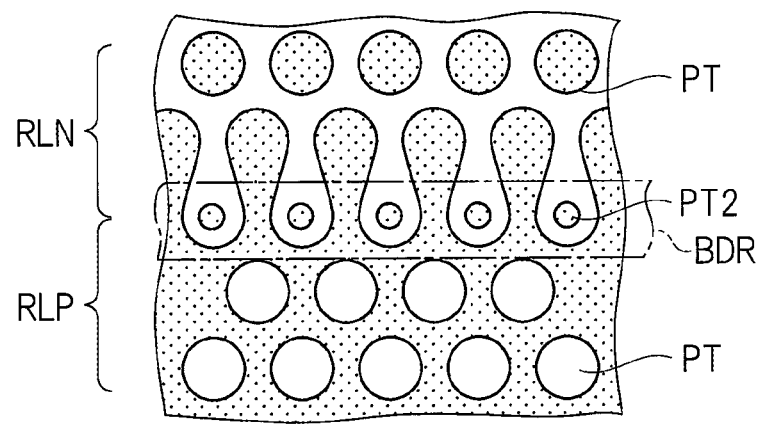
FIG. 9 is a plan view illustrating a configuration of a detection electrode according to a second embodiment.

FIG. 9 is a plan view illustrating a plane of a detection electrode according to the second embodiment. FIG. 9 illustrates only the detection electrode RL formed on the second substrate CGB and does not illustrate the signal line SL, the pixel region, and the like. Also in this second embodiment, the plurality of first patterns PT are arrayed to have the signal line cross pattern in each of the first region RLP forming the detection electrode RL and the second region RLN serving as the conductive pattern CP like in the case of FIGS. 4 to 6.

Namely, in the first region RLP, a plurality of non-formation regions each of which has a planar shape of the first pattern PT are provided in a conductive film illustrated by dots. Further, the non-formation regions are arrayed so that a virtual line connecting center points of the first patterns PT adjacent to each other crosses the subpixel array direction SSD. Meanwhile, a plurality of formation regions each of which has the planar shape of the first pattern are provided in the second region RLN. Further, the formation regions are arranged so that the virtual line connecting center points of the first patterns PT adjacent to each other crosses the subpixel array direction SSD.

In the second embodiment, a plurality of second patterns PT2 are arrayed in the second region RLN in the boundary region BDR between the first region RLP and the second region RLN in a plan view. The second pattern PT2 is similar to the first pattern PT and has a circular shape in a plan view, but the area of the second pattern PT2 is smaller than the area of the first pattern PT. In the example illustrated in FIG. 9, the second pattern PT2 is a formation region of a conductive film, and thus, a conductive film having a small area is formed in a portion of the boundary region BDR in the second region RLN.

By adjusting the area of the second pattern PT2, difference between the area of the conductive film per unit area in the first region RLP and the area of the conductive film per unit area in the second region RLN is decreased in the boundary region BDR between the first region RLP and the second region RLN. Accordingly, it is possible to reduce the difference in the reflection appearance. In addition, it is possible to reduce the difference in the reflection appearance without considering the directivity because the second pattern PT2 has the circular shape.

In the example illustrated in FIG. 9, the first region RLP is configured to have a curved surface shape so as to be aligned with a shape of the second pattern PT2 in the boundary region BDR between the first region RLP and the second region RLN. Accordingly, it is possible to prevent the large linear region from being generated in the boundary region BDR, and to reduce the directivity of the first region RLP in the boundary region BDR. As a result, it is possible to further reduce the difference in the reflection appearance.

Although not particularly limited, the second patterns PT2 are arrayed so that a virtual line connecting center points of the second patterns PT2 crosses the subpixel array direction SSD.

<First Modification Example>

Figure 10:
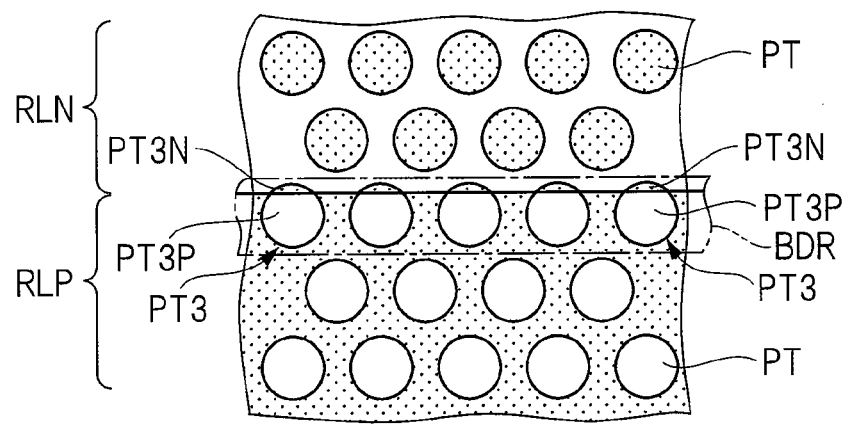
FIG. 10 is a plan view illustrating a configuration of a detection electrode according to a first modification example of the second embodiment.

FIG. 10 is a plan view illustrating a plane of a detection electrode according to a first modification example of the second embodiment. Since FIG. 10 is similar to FIG. 9, a different point will be mainly described here. In FIG. 10, a reference character PT3 represents a third pattern. The third pattern PT3 has a circular outer shape in a plan view like the first pattern PT described above.

The third pattern PT3 includes a region PT3N, which is arranged in the first region RLP and protrudes from the first region RLP to the second region RLN, and a region PT3P which is arranged in the first region RLP. Here, the region PT3N serves as a formation region in which a conductive film is formed, and the region PT3P serves as a non-formation region in which the conductive film to be an electrode is not formed. Namely, in the third pattern PT3, the conductive film is formed in the region PT3N, and the conductive film is not formed in the region PT3P. Thus, the third pattern PT3 has the circular outer shape similar to that of the first pattern PT, but is the pattern having a different shape from the first pattern PT.

For example, it is possible to reduce a difference between the area of the conductive film per unit area of the first region RLP in the boundary region BDR and the area of the conductive film per unit area of the second region RLN in the boundary region BDR by changing the area of the region PT3N protruding to the second region RLN. In addition, an outer shape of the region PT3N protruding to the second region RLN is a curved shape, and a part of the region PT3P in contact with the conductive film in the first region RLP also has a curved shape. Accordingly, it is possible to reduce the directivity. As a result, it is possible to reduce the difference in the reflection appearance.

<Second Modification Example>

Figure 11:
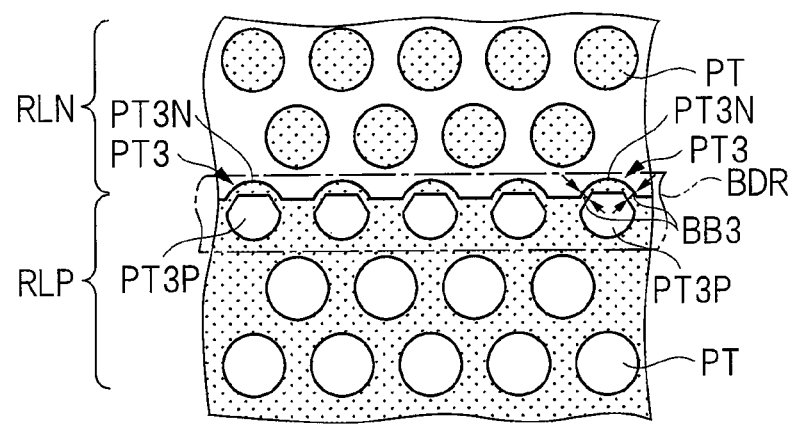
FIG. 11 is a plan view illustrating a configuration of a detection electrode according to a second modification example of the second embodiment.

FIG. 11 is a plan view illustrating a plane of a detection electrode according to a second modification example of the second embodiment. Since FIG. 11 is similar to FIG. 10, a different point will mainly be described. Also in the second modification example illustrated in FIG. 11, the third pattern PT3 includes the region PT3N protruding to the second region RLN and the region PT3P arranged in the first region RLP. In the second modification example, a width BB3 of a connection region that connects the region PT3N and a conductive film of the first region RLP is increased in order to more reliably obtain electrical connection between the conductive film forming the first region RLP and a conductive film forming the region PT3N protruding to the second region RLN.

A decrease in performance of the detection electrode RL is concerned when the region PT3N and the conductive film of the first region RLP are separated from each other due to the variation in manufacturing. In the second modification example, by increasing the width BB3 of the connection region, it is possible to prevent the region PT3N from being separated from the conductive film of the first region RLP due to the variation, and to achieve the stabilization of performance.

<Third Modification Example>

Figure 12:
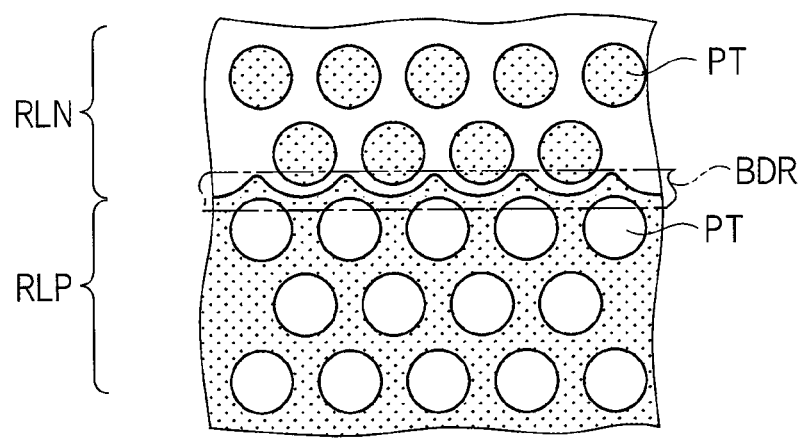
FIG. 12 is a plan view illustrating a configuration of a detection electrode according to a third modification example of the second embodiment.

FIG. 12 is a plan view illustrating a plane of a detection electrode according to a third modification example of the second embodiment. In this third modification example, a conductive film of the first region RLP is formed on the second substrate CGB so that the boundary region BDR has a wave shape in a plan view.

For example, it is possible to reduce a difference between the area of the conductive film per unit area of the first region RLP in the boundary region BDR and the area of the conductive film per unit area of the second region RLN in the boundary region BDR by changing the amount of the wave-shaped portion entering the second region RLN. In addition, since the boundary region BDR has the wave shape, it is possible to reduce the generation of the large linear region, and to reduce the directivity. As a result, it is possible to reduce the difference in the reflection appearance.

Although not particularly limited, a ratio between the area in the first pattern PT arrayed in the first region RLP and the area in the first pattern PT arrayed in the second region RLN is within a range from 3:2 to 2:3 in the first and second embodiments. In addition, a radius of the first pattern PT is within a range from 5 μm and to 250 μm.

A person having an ordinary skill in the art can make various modification examples and correction examples within a scope of the idea of the present invention, and it is interpreted that the modification examples and the correction examples also belong to the scope of the present invention.

For example, the examples obtained by performing addition or elimination of components or design change or the examples obtained by performing addition or reduction of process or condition change to the embodiments described above by a person having an ordinary skill in the art are also included in the scope of the present invention as long as they include the gist of the present invention.

For example, although the case where the signal line SL extends in the Y direction and the detection electrode RL extends in the X direction has been described in the embodiments, the X direction and the Y direction change depending on the viewpoint. The case where the signal line SL extends in the X direction and the detection electrode RL extends in the Y direction configured by changing a viewpoint is also included in the scope of the present invention. In addition, the expression "parallel" used in the present specification means to extend without intersecting each other from one end to the other end. Thus, even though a part or the entire part of one line is provided in the state of being inclined to the other line, this state is also considered as "parallel" in the present specification when the lines do not intersect each other from one end to the other end. In addition, the liquid crystal display device has been described by way of example in the embodiments, but the invention is not limited thereto, and can be applied also to an OLED display device.

The example in which a drive signal for detection is supplied to the drive electrode TL and a change of the charge amount is detected by the detection electrode RL, thereby detecting the touch has been described in the embodiments, but the present invention is not limited thereto. For example, touch may be detected by a so-called self-capacitance method. In this case, a drive signal for detection is supplied to the detection electrode RL and a change of the charge amount in the detection electrode RL is detected after elapse of a predetermined time, thereby detecting the touch. In this case, the detection electrode RL extending in the X direction and the detection electrode RL extending in the Y direction are provided in order to specify coordinates of a touched position.

What is claimed is:

1. A display device comprising:
a detection electrode and a conductive pattern which are provided in an insulating substrate and formed of a conductive film;
a detection circuit which is electrically connected to the detection electrode and detects proximity or contact of an object;
a plurality of subpixel regions in which pixel electrodes are formed;
pixel regions each composed of the plurality of subpixel regions; and
a display region in which the pixel regions are arrayed,
wherein the pixel regions each include a first subpixel region of a first color and a second subpixel region of a second color as the plurality of subpixel regions,
a plurality of the first subpixel regions are arrayed in a first direction in the display region,
a plurality of first patterns are formed in the detection electrode in a plan view,
the detection electrode includes a first region that is electrically connected to the detection circuit inside the display region,
the conductive pattern includes a second region that is separated from the detection electrode,
the first region extends in a second direction crossing the first direction,
a virtual line connecting centers of the plurality of first patterns adjacent to each other extends in the second direction, and
a distance ratio when a distance between the centers of the plurality of first patterns is set as a numerator and a distance between centers of the pixel regions is set as a denominator, is within a range of higher than 0.8 and lower than 0.95.

2. The display device according to claim 1,
wherein a boundary region between the first region and the second region extends in the second direction.

3. The display device according to claim 1,
wherein a non-formation region of the conductive film is the first pattern in the first region, and a formation region of the conductive film is the first pattern in the second region.

4. The display device according to claim 1,
wherein the second region includes a second pattern which is a formation region of the conductive film in a boundary region between the first region and the second region, and
the second pattern is similar to the first pattern and has a smaller area than that of the first pattern.

5. The display device according to claim 1,
wherein the first region includes a third pattern which is a formation region of the conductive film in a boundary region between the first region and the second region, and
the third pattern has a shape different from that of the first pattern in the first region.

6. The display device according to claim 1, further comprising:
a peripheral region which is arranged on an outer side of the first region and the second region and on which a light shielding film is overlapped, in a plan view,
wherein the detection electrode includes a third region which is positioned on an outer side of the first region and a fourth region which is positioned on an outer side of the second region in the peripheral region,
the first pattern is not present in the third region, and the third region is electrically connected to the detection circuit, and
the first pattern is present in the fourth region, and the fourth region is electrically separated from the detection circuit.

7. The display device according to claim 6,
wherein the detection electrode includes a fifth region in which the first pattern is present, between the first region and the third region in the peripheral region.

8. The display device according to claim 1,
wherein the pixel regions each include a third subpixel region of a third color as the subpixel region, and
the first pattern in the detection electrode is overlapped on the first subpixel region, the second subpixel region, and the third subpixel region in a plan view.

9. The display device according to claim 1,
wherein the second subpixel region is a white subpixel region.

10. The display device according to claim 2,
wherein a non-formation region of the conductive film is the first pattern in the first region, and a formation region of the conductive film is the first pattern in the second region.

11. The display device according to claim 2,
wherein the second region includes a second pattern which is a formation region of the conductive film in a boundary region between the first region and the second region, and
the second pattern is similar to the first pattern and has a smaller area than that of the first pattern.

12. The display device according to claim 3,
wherein the second region includes a second pattern which is a formation region of the conductive film in a boundary region between the first region and the second region, and
the second pattern is similar to the first pattern and has a smaller area than that of the first pattern.

13. The display device according to claim 2,
wherein the first region includes a third pattern which is a formation region of the conductive film in a boundary region between the first region and the second region, and
the third pattern has a shape different from that of the first pattern in the first region.

14. The display device according to claim 3,
wherein the first region includes a third pattern which is a formation region of the conductive film in a boundary region between the first region and the second region, and
the third pattern has a shape different from that of the first pattern in the first region.

15. The display device according to claim 2, further comprising:
a peripheral region which is arranged on an outer side of the first region and the second region and on which a light shielding film is overlapped, in a plan view,
wherein the detection electrode includes a third region which is positioned on an outer side of the first region and a fourth region which is positioned on an outer side of the second region in the peripheral region, the first pattern is not present in the third region, and the third region is electrically connected to the detection circuit, and the first pattern is present in the fourth region, and the fourth region is electrically separated from the detection circuit.

16. The display device according to claim 3, further comprising:
   a peripheral region which is arranged on an outer side of the first region and the second region and on which a light shielding film is overlapped, in a plan view,
   wherein the detection electrode includes a third region which is positioned on an outer side of the first region and a fourth region which is positioned on an outer side of the second region in the peripheral region,
   the first pattern is not present in the third region, and the third region is electrically connected to the detection circuit, and
   the first pattern is present in the fourth region, and the fourth region is electrically separated from the detection circuit.

17. The display device according to claim 4, further comprising:
   a peripheral region which is arranged on an outer side of the first region and the second region and on which a light shielding film is overlapped, in a plan view,
   wherein the detection electrode includes a third region which is positioned on an outer side of the first region and a fourth region positioned on an outer side of the second region in the peripheral region,
   the first pattern is not present in the third region, and the third region is electrically connected to the detection circuit, and
   the first pattern is present in the fourth region, and the fourth region is electrically separated from the detection circuit.

18. The display device according to claim 5, further comprising:
   a peripheral region which is arranged on an outer side of the first region and the second region and on which a light shielding film is overlapped, in a plan view,
   wherein the detection electrode includes a third region which is positioned on an outer side of the first region and a fourth region which is positioned on an outer side of the second region in the peripheral region,
   the first pattern is not present in the third region, and the third region is electrically connected to the detection circuit, and
   the first pattern is present in the fourth region, and the fourth region is electrically separated from the detection circuit.

19. The display device according to claim 2,
   wherein the pixel regions each include a third subpixel region of a third color as the subpixel region, and
   the first pattern in the detection electrode is overlapped on the first subpixel region, the second subpixel region, and the third subpixel region in a plan view.

\* \* \* \* \*